S. H. HART.
EXPLOSIVE ENGINE.
APPLICATION FILED OCT. 11, 1919.
1,410,752. Patented Mar. 28, 1922.
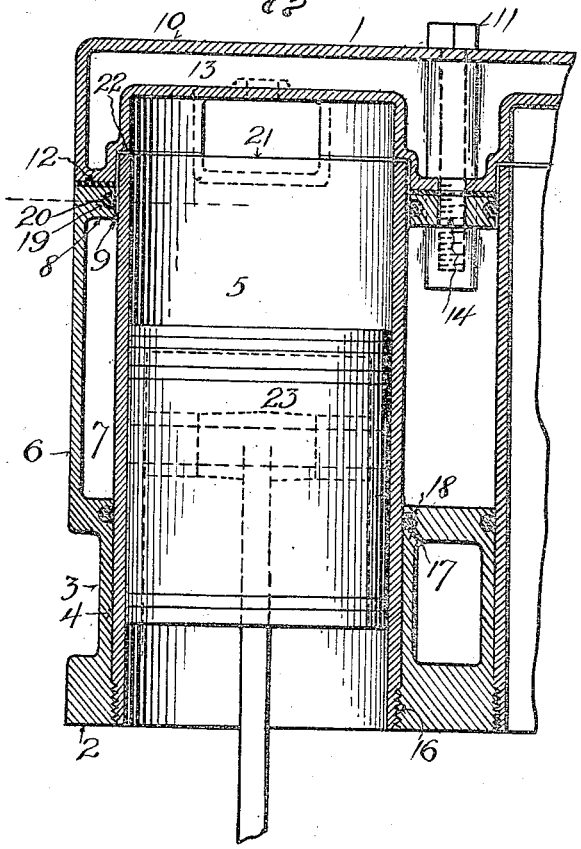

United States Patent Office.

SIDNEY H. HART, OF BROOKLYN, NEW YORK, ASSIGNOR OF FIFTEEN ONE-HUNDREDTHS TO CHARLES G. HENSLEY, OF BROOKLYN, NEW YORK.

EXPLOSIVE ENGINE.

1,410,752.   Specification of Letters Patent.   Patented Mar. 28, 1922.

Application filed October 11, 1919. Serial No. 330,044.

*To all whom it may concern:*

Be it known that I, SIDNEY H. HART, a citizen of the United States, and a resident of the borough of Brooklyn, in the city and State of New York, have invented certain new and useful Improvements in Explosive Engines, of which the following is a specification.

My invention relates to engines or motors in which gaseous fuel mixed with air is compressed and exploded. My invention is especially adapted for use in automobile engines although it is also applicable to stationary and marine engines operated either by natural gas, producer gas or vaporized hydrocarbons.

One of the objects of my invention is to provide an engine or motor of the above mentioned type, having a removable piston race or cylinder whereby the cylinder may be made separately from the block containing the water jacket. My object is to provide a simple and efficient construction which will permit of the manufacture of the piston race or cylinder separate from the block and which will permit the piston race or cylinder to be easily removed and replaced. There are several important advantages in a construction of this character. One is, that the cylinder or piston race may be made of the kind of metal best adapted for the purpose and the block may be made of the kind of metal best adapted for the particular requirements, the block and cylinder being made of different metals instead of being cast in one piece from the same metal. Another advantage is. that the cylinder when made separate from the block may be made very uniform in thickness and the thickness may be determined to suit the requirements. Where the cylinder is cast in one piece with the block the wall of the cylinder is not of uniform thickness and as a result different parts thereof expand and contract unequally. It is not possible, when the cylinder is cast with the block, to secure uniformity in the thickness of the cylinder, and sometimes the wall is so thin in places that it gives way or breaks down in use, necessitating the replacement of the whole block or so much thereof as may be in one piece. In the present construction, if a cylinder becomes scored or is otherwise defective it is only necessary to replace the defective cylinder and not the entire block.

Another object of my invention is to provide an engine or motor in which the cylinder may expand and contract equally and in all directions, or at least that portion of the cylinder wherein the explosion takes place or where the piston travels and which is subjected to rapid variations in temperature. To a great extent, the efficiency of an explosive engine depends upon holding the compression and this can not be done if the clearance between the piston and the cylinder is not kept uniform and this is rendered difficult on account of the rapid variations in temperature. In the present construction the upper portion of the cylinder, or that part wherein the explosion takes place and in which the piston travels, at least is made with a wall of uniform thickness so that the expansion and contraction is equal in all directions thereby increasing the efficiency of the engine. Furthermore, the cylinder is fastened only at its lower portion and its upper portion is so arranged and packed that it is free to expand and contract longitudinally and equally and it is free to expand and contract uniformly circumferentially. As the cylinder expands and contracts it remains cylindrical, whereas, in former practice, it expanded unequally and it was not maintained cylindrical. Where two cylinders have the same total expansion and one expands unequally or out of round and the other expands equally and remains round the compression will be more perfectly held in the latter than in the former, because the clearance between the piston and cylinder at any point will be uniform though the total expansion of the cylinder is as great as in the first mentioned example. In the present structure it is possible to maintain the piston race perfectly cylindrical in operation.

Another advantage of the present invention is that notwithstanding the fact that the cylinder is removable, the pistons may be "run in" while the head is off. Is is common practice to "run in" the pistons before an engine leaves the factory, and this is generally accomplished by running the pistons from some source of power other than the engine itself, in order to wear the cylinder and piston rings smooth. This is usually done with the head removed from the engine. In removable cylinder engines as heretofore made, the head has been used to hold the cylinder in place and therefore the pistons could not be "run in" with the heads removed. In the present case the pistons may be "run in" the same as where the cylinder is a part of the block.

In the present case I have illustrated my invention as applied to an engine with a removable head and I have claimed the invention broadly. In my copending application Ser. No. 330,045 filed October 11, 1919, I have shown my invention applied to an engine having a solid head.

In the drawing forming a part of this application,

Figure 1 is a vertical sectional view of an engine embodying my invention, and

Figure 2 is a vertical sectional view of the cylinder or piston race detached.

Fig. 3 is a cross-sectional view taken in the plane of the upper packing groove.

I have shown in the drawings, Figure 1, the block and cylinder in vertical section. The block 1 may be cast for single or multiple cylinder engines and in the drawing I have shown the block 1, having a water jacket for the cylinder and I have shown the same continued toward another unit to indicate how the block may be cast for multiple cylinder engines. The bottom 2 of the block is generally faced off smooth in order that it may be bolted onto the crank casing (not shown). The lower portion of the block has a vertical wall 3 provided with a bore 4 adapted to receive the cylinder 5, and at 6 the block extends laterally away from the cylinder to form a water circulating compartment 7 in which the water for cooling the upper portion of the cylinder is held. The top 8 of the block has a bore 9 adapted to receive the cylinder 5 but the bore is somewhat larger than the external diameter of the cylinder; that is, this bore 9 is sufficient to provide clearance so that when the cylinder expands while the engine is operating it will not come into contact with the block itself at the top.

The engine is shown herein provided with a removable head 10 attached to the block by the bolts 11 and provided with suitable packing 12 between the block and the head. The head is shown provided with a water cooling jacket 13, and the water circulates between this jacket and the cylinder jacket 7 through the connection 14.

The cylinder, which is shown detached in Figure 2 consists of a smooth, cylindrical tube, the upper portion at least of which is of uniform thickness and is free of all protuberances, shoulders and flanges. This cylinder fits into the bore 4 at the lower part of the block and into the bore 9 and the latter is large enough to provide a clearance space. The cylinder is secured in the block at its lower end or at least as low as the bottom of the stroke of the piston. Preferably, it is secured at its extreme lower end. I have shown a male thread 15 cut into the end of the cylinder and this screws into the female thread 16 in the block 1 at the bottom of the bore 4, the top of the thread 16 extending inwardly to receive the thread 15. The cylinder is inserted into the block from the top until the thread 15 reaches the thread 16 and then the cylinder is turned to lock the threads, until the end of the cylinder lies flush with the bottom 2 of the block.

I have provided a recess 17 in the block and at the bottom of the water jacket 7, extending circumferentially around the cylinder; and in this recess I provide a ring of packing 18 which may consist of asbestos or any other suitable non-burning packing. This packing prevents any leakage of the water between the cylinder and the lower end of the water jacket. Near the upper end of the cylinder there is a recess 19 in the block, also extending circumferentially around the cylinder, in which there is placed a packing ring 20 similar to the ring 18. This packing 20 engages the outer surface of the cylinder, as does also the packing 18, and it prevents the water in the jacket from passing between the block and the cylinder at this place and it also prevents the explosive gases from escaping. The top 21 of the cylinder extends slightly above the block 1 and the head 10 is provided with a recess or rabbet 22 in which the projecting end of the cylinder lies, but there is a slight clearance between the block and the upper end of the cylinder and between the head 10 and the cylinder.

The piston 23 travels in the upper portion of the cylinder, as in other engines, its stroke being confined to that part of the cylinder above the packing 18.

When the device is in operation the explosions take place above the piston, as is usual, and the upper part of the cylinder is subjected to rapid variations in temperatures due to the heat of combustion and to the cooling action of the new charges taken into the cylinder. The high and low temperatures also fluctuate as the engine is operated at different speeds. The changes in temperature effect changes in the cylinder, causing the latter to expand and contract, both circumferentially and longitudinally. The cylinder expands and contracts principally at the top where the explosions take place and as this is the part wherein the piston moves the changes here affect the operation of the engine. The natural tendency of the present cylinder is to expand uniformly at the upper end at least because the wall thereof is of uniform thickness. In the present construction this equal expansion is not prevented because the cylinder does not touch the block and the packing 20 is compressible so that the cylinder can expand and contract circumferentially and equally all around. The cylinder can also expand longitudinally because it is only held or fixed at the bottom and at the top there is sufficient clearance between it and the head to permit of the expansion of the cylinder longitudinally. The clearance between the block and the cylinder and between the head and the cylinder is exaggerated in the drawing as only a few thousandths of an inch will be necessary in practice.

In the present case the packing 20 will be sufficient to prevent escape of the explosive pressure because the gases in the explosion chamber, before reaching this packing, must pass through the space or clearance between the cylinder and head and in doing so they are deflected and their force is so lessened that the packing 20 will prevent any escape of the gases.

As the cylinder expands freely and equally there are no local increases in clearance between the piston rings and cylinder to cause loss of compression, nor will there be distortions in the cylinder to cause unequal or local wear between the piston rings and cylinder.

It will be apparent that as the cylinder is fastened at the bottom the piston may be run in by operating it while the head is removed.

Whenever the cylinder has been scored or otherwise injured, it is only necessary to remove the head, unscrew the cylinder and remove and replace it. The engine will then be equal to a new one and the cost of reboring or of providing a whole new block is avoided.

Having described my invention what I claim is;

1. An explosion engine including a cylinder block, a cylinder therefor and a piston movable in the cylinder, that portion of said cylinder in which the piston travels and in which combustion takes place, consisting of a tube having a wall of uniform thickness throughout said portion and means for detachably securing the lower end of the cylinder in said block, said engine being constructed to permit the upper portion of the cylinder to expand circumferentially and longitudinally.

2. An explosion engine including a cylinder block, a cylinder therefor and a piston movable in the cylinder, that portion of the cylinder in which the piston normally travels and in which combustion takes place, consisting of a tube having a wall of uniform thickness throughout said portion, and means for securing the lower portion of the cylinder in said block, said engine being constructed to permit the upper or explosion portion of the cylinder to expand longitudinally and circumferentially and equally at all parts of said upper portion, and a compressible packing in said block engaging the peripheral surface of said cylinder and adapted to permit said cylinder to expand longitudinally and circumferentially.

3. An explosion engine including a cylinder block, a cylinder head, a cylinder and a piston movable in the cylinder, that portion of said cylinder in which the piston normally travels and in which combustion takes place, consisting of a tube having a straight wall of uniform thickness throughout said portion, and means for securing the lower portion of the cylinder in the block, the upper portion of the cylinder being unsecured, said block and said head being formed to provide clearance in relation to the cylinder whereby the upper portion of the cylinder may expand circumferentially and longitudinally, and a compressible packing for the upper portion of the cylinder adapted to permit the latter to expand circumferentially and longitudinally.

4. An explosion engine including a cylinder block, a cylinder head, a cylinder and a piston movable in the cylinder, said cylinder or at least that portion thereof in which the piston normally travels and in which combustion takes place, consisting of a tube having a straight wall of uniform thickness throughout said portion, and means for securing the lower portion of the cylinder in said block, the upper portion of the cylinder being unsecured, said cylinder and said head being formed to provide a clearance in relation to the cylinder whereby the upper portion of the latter may expand and contract circumferentially and longitudinally, and a compressible packing in said block engaging the peripheral surface of the cylinder and spaced below the top of the cylinder for the purpose set forth.

5. An explosion engine including a cylinder block, a removable cylinder head, a removable cylinder, and a piston movable in the cylinder, said cylinder consisting of a tube having a straight wall of uniform thickness and adapted to be inserted into said block from the top thereof and means for detachably securing the lower end of the cylinder in the block, the upper portion of the cylinder being unsecured, said block and said head being formed to provide a clearance in relation to the cylinder whereby the upper portion of the cylinder may expand circumferentially and longitudinally, and a compressible packing for the upper portion of the cylinder.

6. An explosion engine including a cylinder block, a removable cylinder head, a removable cylinder, and a piston movable in the cylinder, said cylinder consisting of a tube having a straight wall of uniform thickness and adapted to be inserted into said block from the top thereof, a thread on the lower end of the cylinder and a thread on the block to receive the thread on the cylinder, the upper portion of the cylinder being unsecured, said block and said head being formed to provide a clearance in relation to the upper portion of the cylinder whereby said upper portion may expand circumferentially and longitudinally, and a compressible packing for the upper portion of the cylinder.

Signed at the city, county and State of New York, this 26th day of August, 1919.

SIDNEY H. HART.